United States Patent [19]

Hamada

[11] Patent Number: 4,633,995

[45] Date of Patent: Jan. 6, 1987

[54] PARTS FEEDER WITH CHUTE

[75] Inventor: Genichi Hamada, Uozu, Japan

[73] Assignee: Yoshida Kogyo K. K., Tokyo, Japan

[21] Appl. No.: 759,516

[22] Filed: Jul. 26, 1985

Related U.S. Application Data

[63] Continuation of Ser. No. 555,159, Nov. 25, 1983, abandoned.

[30] Foreign Application Priority Data

Nov. 25, 1982 [JP] Japan .................. 57-178343

[51] Int. Cl.⁴ ............................................. B65G 11/18
[52] U.S. Cl. ..................................... 193/2 R; 198/757; 198/763
[58] Field of Search ............... 193/2 R; 198/391, 609, 198/757, 763, 764

[56] References Cited

U.S. PATENT DOCUMENTS

| | | | |
|---|---|---|---|
| 2,876,891 | 3/1959 | Long et al. ................. | 198/763 |
| 2,885,067 | 5/1959 | Morris ....................... | 198/763 |
| 3,011,625 | 12/1961 | Bailey et al. ............... | 198/757 |
| 3,031,060 | 4/1962 | Philippovic et al. ........ | 198/391 X |
| 3,277,996 | 10/1966 | Thurston et al. ............ | 198/391 |
| 4,162,778 | 7/1979 | Kraft ......................... | 198/763 X |
| 4,440,286 | 4/1984 | Saxon ........................ | 198/391 X |
| 4,519,524 | 5/1985 | Hirose ....................... | 198/757 X |

FOREIGN PATENT DOCUMENTS

| | | | |
|---|---|---|---|
| 2455410 | 8/1976 | Fed. Rep. of Germany ...... | 198/757 |
| 52-4692 | 1/1977 | Japan . | |
| 143641 | 6/1960 | U.S.S.R. ........................ | 198/757 |

*Primary Examiner*—Joseph F. Peters, Jr.
*Assistant Examiner*—Daniel R. Edelbrock
*Attorney, Agent, or Firm*—Hill, Van Santen, Steadman & Simpson

[57] ABSTRACT

A chute for use with an electromagnetically vibratable parts feeder has an inlet end attached to a bowl tangentially thereto and an outlet end remote from the inlet end. A leaf spring assembly is disposed below the chute and attached thereto adjacent to the outlet end. The leaf spring assembly is inclined at an angle to the chute, and comprises a pair of parallel spaced leaf springs or a sole leaf spring. Each of the leaf springs has an upper end coupled to the chute and a lower end adapted for attachment to a stationary base such as a machine base. The upper end is located more closely than the lower end to the outlet end of the chute. When the bowl is electromagnetically vibrated in circular back-and-forth movements, the chute is reciprocably moved back and forth to cause parts to move forward therealong due to inertia.

1 Claim, 6 Drawing Figures

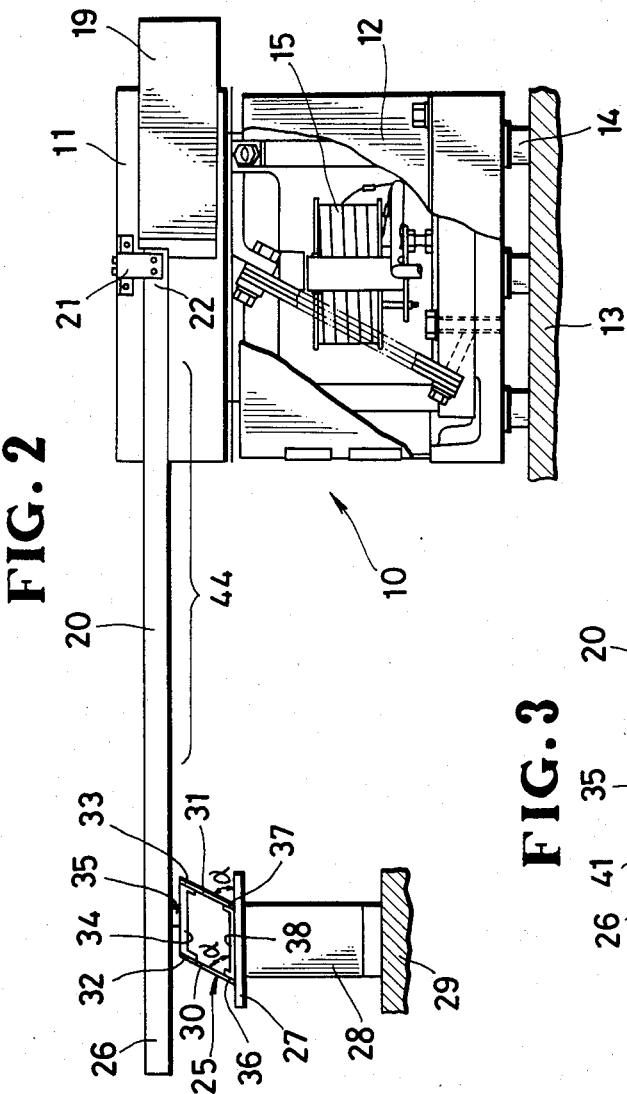

PARTS FEEDER WITH CHUTE

This is a continuation of application Ser. No. 555,159, filed Nov. 25, 1983, now abandoned.

BACKGROUND OF THE INVENTION

1. Field of the Invention

The present invention relates to a parts feeder, and more particularly to a chute for automatically feeding parts in a succession in a vibratory parts feeder capable of automatically supplying parts to a machining apparatus or an assembling apparatus, for example.

2. Prior Art

Known vibratory parts feeders utilizing electromagnetic vibrations for feeding parts include a funnel-shaped bowl having a parts feeding track extending helically along an inner surface thereof. The vibratory parts feeder operates by imparting arcuate vibrations to the bowl to guide the parts stored in the bowl upwardly on the parts feeding track toward an upper edge of the bowl, from which they are automatically supplied down a chute to a machining apparatus or an assembling apparatus. To enable the parts to be fed along the chute to the end thereof remote from the parts feeder, the chute is inclined or a suitable pusher is incorporated for forcibly pushing the parts successively down the chute. These prior arrangements however fail to supply the parts stably. For example, Japanese Utility Model Publication No. 52-4692 discloses a parts feeder chute having one end pivotably supported on a parts discharge unit on a parts feeder bowl with the other free end fitted in a support for longitudinal movement. With the disclosed arrangement, the free end of the chute moves vertically and back and forth, but the chute fails to produce forward pushing required for positively feeding parts horizontally.

SUMMARY OF THE INVENTION

According to the present invention, a chute for use with a parts feeder having a vibratable bowl includes an inlet end connected to an outlet of the bowl in tangential relation thereto and an outlet end remote from the inlet end, and a leaf spring assembly adapted for attachment to a stationary base such as a machine base and coupled to the chute adjacent to the outlet end thereof, the leaf spring assembly being inclined at an angle to the chute. The leaf spring assembly may comprise a pair of parallel spaced leaf springs or a sole leaf spring extending across a longitudinal axis of the chute. Each of the leaf springs has an upper end connected to the chute and a lower end fixed to a base plate adapted for attachment to the stationary base. The upper end of the leaf spring is located more closely than the lower end to the inlet end of the chute. When the bowl is actuated in arcuate back-and-forth vibratory movements which have a vertical component, the chute is reciprocably moved back and forth in the longitudinal direction to feed parts forward therealong due to inertia.

It is an object of the present invention to provide a parts feeder chute having means for converting arcuate back-and-forth vibrations of a parts feeder bowl to substantially rectilinear movement of the chute for delivering parts along the chute.

Another object of the present invention is to provide a parts feeder chute which is prevented from being vibrated transversely while being subjected to short arcuate back-and-forth vibrations of a parts feeder bowl to movement of the inlet of the chute having corresponding vertical and horizontal vector components.

Still another object of the present invention is to provide a parts feeder chute extending horizontally for pooling parts in a horizontal, relatively low position for increased safety and leeway in layout design.

Many other advantages and features of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 2 is a side elevational view, partly broken away, of the parts feeder;

FIG. 3 is a side elevational view of a chute supporting device according to another embodiment.

DETAILED DESCRIPTION

Figure 1:
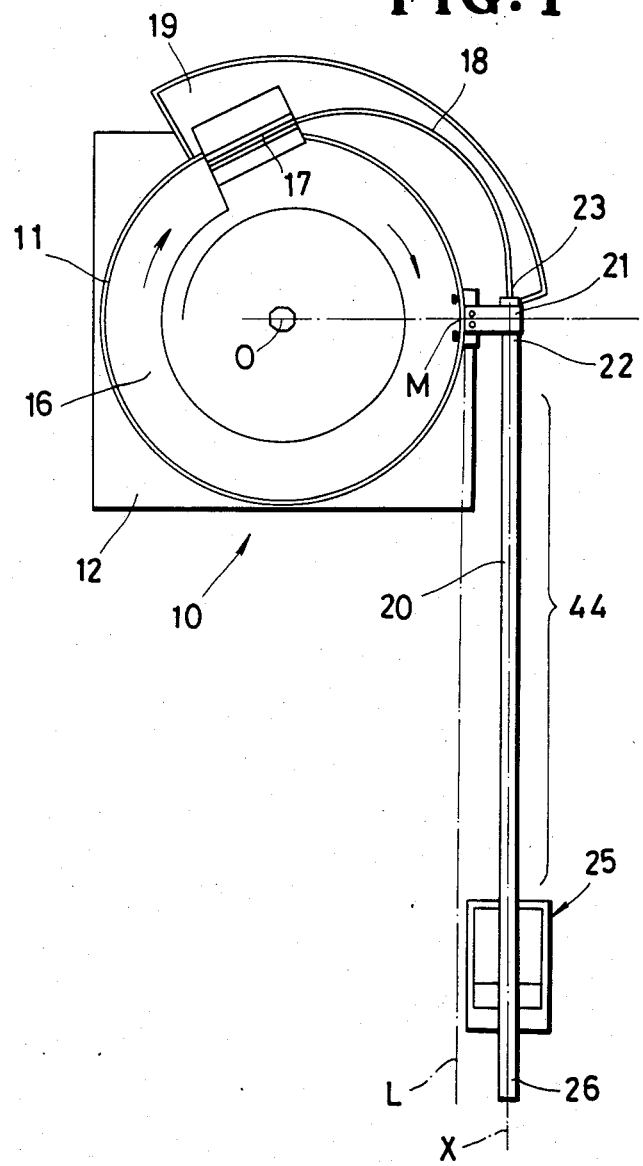
FIG. 1 is a plan view of a parts feeder including a chute according to the present invention.

The principles of the present invention are particularly useful when embodied in a chute combined with a parts feeder, generally designated by the reference numeral 10, as illustrated in FIGS. 1 and 2.

As shown in FIGS. 1 and 2, the parts feeder 10 includes a bowl 11 made of light metal alloy, iron, or steel mounted on a support 12 having legs 14 placed on a base 13 such as a floor. The spport 12 houses therein an electromagnetic vibrator 15 coupled to the bottom of the bowl 11 for imparting vertical forces thereto and electromagnetically energizable for vibrating the bowl 11 in a manner which includes arcuate back-and-forth movements or components of short strokes. As shown in FIG. 2, the bowl 11 is supported by a set of four resilient leaf spring assemblies (3 illustrated), each extending at an angle of about 45° to the vertical. A vertical component of the vertical forces of the vibrator 15 tends to increase and to decrease such angle by a small amount, while the sloping leaf spring assemblies convert a portion of such forces into short arcuate thrusts, thus resulting in short arcuate bowl movements which, sensed at the point M, are functionally equivalent to short rectilinear movements. The bowl 11 has therein a helical parts feeding track 16 made of wear-resistant metal such as steel and extending from the center O of an inner bottom of the bowl 11 helically up to a parts outlet 17 defined as an opening in an upper peripheral wall of the bowl 11. The helical parts feeding track 16 is in the form of a thin elongate web. The parts feeder 10 also includes a parts guiding track 18 having one end attached to the parts outlet 17 and disposed outside of the bowl 11. The parts guiding track 18 comprises a thin web of steel curved along the peripheral wall of the bowl 11. A parts collecting receptacle 19 is affixed to the peripheral wall of the bowl 11 and extends below the parts guiding track 18. The parts guiding track 18 has an opposite end 23 connected to a straight or substantially straight chute 20 having a horizontal chute body in the form of a thin web of steel.

The chute 20 has an inlet end 22 coupled to the parts guiding track 18 and screwed, riveted, or otherwise fastened rigidly to one end of an L-shaped support arm 21 with the opposite end of the arm 21 secured to the peripheral wall of the bowl 11 at the point M thereon. The support arm 21 is made of cast metal and has its longitudinal central axis aligned with a line passing through the center O of the bowl 11 and the point M on the peripheral wall of the bowl 11. The chute 20 has a longitudinal central axis X parallel to a line L tangential to the circumferential surface of the bowl 11 at the point M.

A leaf spring assembly 25 is disposed below and across the chute 20 adjacent to an outlet end 26 thereof remote from the inlet end 22. As shown in FIG. 2, the leaf spring assembly 25 is mounted by a base plate 27 on a support 28 fixedly placed on the body 29 of a machining apparatus or an assembling apparatus (not shown) with which the parts feeder 10 is associated. The leaf spring assembly 25 comprises a pair of parallel leaf springs 30, 31 spaced from each other inclined at an acute angle $\alpha$ to the base plate 27. The leaf springs 30, 31 have upper ends 32, 33, respectively, fixed to an upper horizontal bar 34 attached by a connector 35 to the lower edge of the chute 20, and lower ends 36, 37, respectively, fixed to a lower horizontal bar 38 attached to the base plate 27. The upper ends 32, 33 of the leaf springs 30, 31 are located more closely than the lower ends 36, 37 thereof to the inlet end 22 of the chute 20. The leaf springs 30, 31 are relatively wide in a direction perpendicular to the axis X of the chute 20. The leaf spring assembly 25 is in the form of a parallelogram when viewed in side elevation as illustrated in FIG. 2.

FIG. 3 shows a leaf spring assembly 40 according to another embodiment of the present invention. The leaf spring assembly 40 has a single leaf spring 41 inclined at an acute angle $\alpha$ to the base plate 27. The leaf spring 41 has an upper end 42 secured to the connector 35 and a lower end 43 secured to the base plate 27. The upper end 42 of the leaf spring 41 is disposed more closely than the lower end 43 to the inlet end of the chute 20.

While the chute 20 is shown as being straight, it may be curved in a portion 44 (FIG. 2) between the inlet end 22 and the leaf spring assembly 25 to meet design requirements in the layout of the parts feeder 10 with respect to the machining or assembling apparatus coupled therewith.

The parts feeder 10 and the chute 20 operate as follows: When the electromagnetic vibrator 15 is energized, the bowl 11 is actuated in a motion which includes angular or arcuate back-and-forth horizontal vibrations having a vertical component to cause the parts therein to be transported from the central bottom of the bowl 11 successively one by one up the helical track 16 due to inertia under centrifugal forces produced by the vibratory motion of the bowl 11. The parts reach the outlet 17, from which they move in succession along the parts guiding track 18. Any parts which fail to ride on the parts guiding track 18 drop into the receptacle 19, from which the parts return into the bowl 11 through the bottom thereof.

Figure 4:
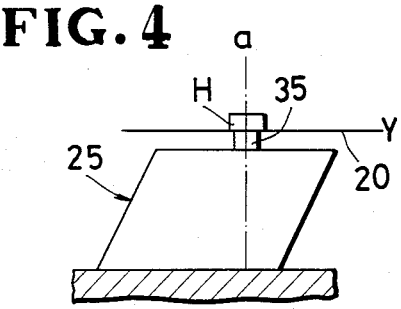
FIGS. 4, 5, and 6 are diagrammatic views showing progressive steps of feeding a part along a chute.
Figure 5:
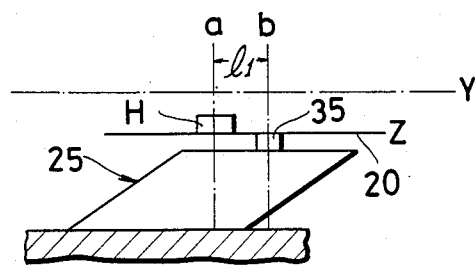
Figure 6:
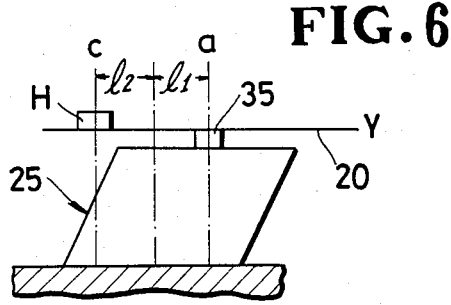

The parts moving down the track 18 now reach the inlet end 22 of the chute 20, which is vibrating back and forth horizontally along the longitudinal axis X thereof due to the the horizontal vector component of the short arcuate but essentially linear back-and-forth vibrations of the bowl 11 at the point M. The parts are then fed along the chute 20 while the latter makes essentially straight back-and-forth vibrations in the longitudinal direction. The rectilinear back-and-forth vibratory movement of the chute 20 for feeding the parts downstream of the inlet end will now be analyzed in detail with reference to FIGS. 4 through 6. It is assumed that a part H is initially disposed in a position a on the chute 20 aligned with the connector 35. When the chute 20 is moved back during one cycle of back-and-forth movement thereof, the chute 20 moves from an upper vertical position Y (FIG. 4) down to a lower vertical position Z (FIG. 5) since the leaf spring assembly 25 collapses resiliently. A part H however remains due to inertia at the position a, and only the chute 20 moves back to cause the connector 35 to be retracted for an interval $l_1$ to a position b as shown in FIG. 5. Then, the force tending to move back the chute 20 disappears, whereupon the chute 20 moves forward and upwardly to the vertical position Y. The part H is now advanced from the position a. When the chute 22 is then subjected to a forward push from the bowl 11, the chute 22 moves forward until it is checked by a leaf spring assembly 25. With the chute 22 stopped suddenly, the part H is pushed forward due to inertia for an interval $l_2$, and then only the chute 20 is moved back to the position shown in FIG. 6. Accordingly, the net result is that the part H is moved forward for the distance $l_1+l_2$ to a position c along the chute 20 while the latter makes one cycle of reciprocatory movement along the longitudinal axis thereof.

An experiment conducted on the basis of the structure shown in FIGS. 1 and 2 indicated that parts could effectively be fed along by a straight chute 20 having a length of 1 m. A longer chute of the illustrated construction can be employed as a parts pool while the parts feeder is in or out of operation.

With the arrangement of the present invention, no linear vibrator is required and the electromagnetic vibrator 15 in the parts feeder 10 remains relatively small in size. Since the horizontal chute 20 can be used as a parts pool, any vertical chute which would otherwise be required as a parts pool can be dispensed with. Accordingly, the parts feeder 10 which would be positioned at an increased heigth can be placed in a low position with greater leeway in parts feeder attachment design. The parts feeder 10 installed in a low position increases parts feeding efficiency and safety, and may be larger in size. With the low installation level of the parts feeder 10, in addition, the parts outlet 17 and the chute support 21 may be relatively simple in construction and no precision gap and steep surfaces are necessary. Consequently, the parts feeder 10 and the chute 20 are durable in operation, can be serviced easily, and constructed less costly.

Although various minor modifications may be suggested by those versed in the art, it should be understood that I wish to embody within the scope of the patent warranted hereon, all such embodiments as reasonably and properly come within the scope of my contribution to the art.

What is claimed is:

1. The combination of a parts feeder with a chute, comprising:
(a) a parts feeder having a bowl with a parts outlet and carried on a support by means of a set of resilient leaf spring assemblies each extending at an angle of about 45° to the vertical, and including a vibrator acting vertically between said support and said bowl whereby a point on the periphery of said bowl will have vertical components and small horizontal arcuate components of motion;

(b) a curved parts-guiding track having one end attached to said parts outlet and disposed outside of said bowl, and having a discharge end;
(c) a parts collecting receptacle secured to said bowl and disposed beneath said parts-guiding track for collecting any parts which fail to ride on said parts-guiding track, said receptacle being adapted to return any collected parts to the bottom of said bowl;
(d) an elongated chute body having a horizontal inlet end carrying a support arm directly connected to said point on said vibratable bowl, said inlet end being connected to said track at said discharge end and extending in parallel to a tangent to said bowl and spaced therefrom by said support arm, said inlet end being directly reciprocated near said point in said vertical and small arcuate components of motion by said bowl, and said chute body having an outlet end remote from said inlet end; and
(e) a leaf spring assembly adapted to be fixed to a stationary base and having an upper end movable in back and forth movements corresponding to the horizontal component of the movement of said inlet end and coupled to said elongated chute body adjacent to said outlet end, said leaf spring assembly being disposed across said elongate chute body and inclined at an angle with respect to said elongate chute body for being reciprocated by said chute body.

* * * * *